United States Patent
Hsu et al.

(10) Patent No.: US 8,424,307 B2
(45) Date of Patent: Apr. 23, 2013

(54) OCEAN THERMAL ENERGY CONVERSION SYSTEM AND CONDENSER THEREOF

(75) Inventors: Po-Hua Hsu, Hsinchu County (TW); Chi-Jung Kuo, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 980 days.

(21) Appl. No.: 12/424,651

(22) Filed: Apr. 16, 2009

(65) Prior Publication Data

US 2010/0122532 A1     May 20, 2010

(30) Foreign Application Priority Data

Nov. 14, 2008    (TW) ................................ 97144211 A

(51) Int. Cl.
*F03G 7/05* (2006.01)

(52) U.S. Cl.
USPC ........................................................ 60/641.7

(58) Field of Classification Search ................. 60/641.6, 60/641.7
See application file for complete search history.

(56) References Cited

U.S. PATENT DOCUMENTS

| 5,582,691 | A | * | 12/1996 | Flynn et al. ..................... 203/11 |
| 2007/0289303 | A1 | * | 12/2007 | Prueitt .......................... 60/641.7 |
| 2008/0314043 | A1 | * | 12/2008 | Howard et al. ............... 60/641.7 |

FOREIGN PATENT DOCUMENTS

| JP | 11148312 A | 6/1999 |
| JP | 2005-180194 A | 7/2005 |
| TW | M267981 U | 1/1996 |
| TW | 589137 B | 6/2004 |
| TW | M320601 U | 10/2007 |

* cited by examiner

*Primary Examiner* — Hoang Nguyen
(74) *Attorney, Agent, or Firm* — Rabin & Berdo, P.C.

(57) ABSTRACT

An ocean thermal energy conversion (OTEC) system includes a working fluid pump, an evaporator, a turbine, a condenser, and a working fluid. The evaporator is connected to the working fluid pump. The turbine is connected to the evaporator. The condenser is respectively connected to the turbine and the working fluid pump, and located in a sea area below sea surface. The condenser includes a condenser main body and a deep sea water pipe. The condenser main body is respectively connected to the turbine and the working fluid pump. The deep sea water pipe is connected to the condenser main body, and has an inlet end and an outlet end. The deep sea water pipe is connected to the condenser main body via the outlet end. The working fluid flows between the working fluid pump, the evaporator, the turbine, and the condenser under the driven of the working fluid pump.

7 Claims, 3 Drawing Sheets

OCEAN THERMAL ENERGY CONVERSION SYSTEM AND CONDENSER THEREOF

CROSS-REFERENCE TO RELATED APPLICATIONS

This non-provisional application claims priority under 35 U.S.C. §119(a) on Patent Application No(s). 097144211 filed in Taiwan, R.O.C. on Nov. 14, 2008 the entire contents of which are hereby incorporated by reference.

BACKGROUND OF THE INVENTION

1. Field of Invention

The present invention relates to a power generation system and a condenser thereof, and more particularly to an ocean thermal energy conversion (OTEC) system and a condenser thereof.

2. Related Art

With the rapid consumption of crude oil reserves in the world, renewable energies such as solar energy, wind, geothermal, ocean energy, and biomass energy having advantages such as cleanness, permanence, low carbon content, and low pollution, have gradually received worldwide attention. Among these, a closed type ocean thermal energy conversion (OTEC) plant employs Rankine cycle power system to convert the temperature thermal energy (a temperature difference) between warm surface sea water and cold deep sea water into rotational kinetic energy by a turbine, then generates an electric power by a power generator or directly outputs the shaft power.

Generally speaking, when a temperature difference between surface sea water and deep sea water in a sea area exceeds over 20° C., an OTEC plant could be used to convert the thermal energy into electric power in the conventional art. Oceans in tropical and subtropical areas are suitable for mounting OTEC plant, because the temperature of surface sea water in these areas would be as high as 25-30° C. all the year round, and the deep sea water temperature would be 4-6° C. as the water depth of these sea areas reaches 700-1000 meters.

Under the temperature conditions of the above heat source (i.e., the surface sea water) and heat sink (i.e., the deep sea water), the Carnot cycle efficiency is about 6.4%-8.5%. However, in an actual state, since the surface sea water has to transfer thermal energy to a working fluid through an evaporator, and the working fluid in turn has to release thermal energy to the deep sea water through a condenser, the heat exchange can be performed only if a temperature difference exists between the sea water and the working fluid. Moreover, since constitutional elements of a power generation system all have pressure loss and heat dissipation, the actual thermal efficiency of a conventional OTEC plant is only 2.0-3.0%.

Since the actual thermal efficiency of a conventional OTEC plant is low, the plant requires both a large amount of surface sea water and deep sea water in the conventional art to meet the demand for the rated power capacity of the plant. Since the large amount of sea water requirement, the diameter of a sea water pipe for the conventional power generation system is quite huge. Taking a 5 MW conventional OTEC plant as an example, the requirement for the surface sea water and deep sea water always exceeds 1 megaton per day respectively, provided that the efficiency of the plant is 2.5%. In this way, the pipe diameter of the sea water pipe is over 3.2 meters. While using such a sea water pipe to transport deep sea water from 700-1000 meters depth to a land-based plant, this sea water pipe encounters severe challenges such as bending stress, shear force, vibration, and warping due to the violent wave or marine current, and it is susceptibly damaged or destroyed.

Based on the above, in a conventional OTEC plant, the sea water pipe for transporting deep sea water has a high manufacturing cost (account for about 20% of the manufacturing cost of the power plant), and has a poor reliability during operation.

SUMMARY OF THE INVENTION

Accordingly, the present invention of an ocean thermal energy conversion (OTEC) system is to dispose a condenser underwater which would solve the problems in the prior art that a sea water pipe of a conventional OTEC system is easily damaged due to harsh operating environment.

The present invention provides an OTEC system applied in an OTEC, which includes a working fluid pump, an evaporator, a turbine, a condenser, and a working fluid. The evaporator is connected to the working fluid pump. The turbine is connected to the evaporator. The condenser is respectively connected to the turbine and the working fluid pump and located in a sea area and below a sea level. The condenser includes a condenser main body and a deep sea water suction pipe. The condenser main body is respectively connected to the turbine and the working fluid pump. The deep sea water suction pipe is connected to the condenser main body, and has a first inlet end and a first outlet end. The deep sea water suction pipe is connected to the condenser main body via the first outlet end, and the first inlet end is located below the first outlet end. The working fluid flows between the working fluid pump, the evaporator, the turbine, and the condenser under the driven of the working fluid pump.

According to a preferred embodiment of the present invention, the evaporator and the turbine are located over sea surface or on land.

According to a preferred embodiment of the present invention, the condenser is located between 50 meters and 100 meters depth below sea surface. Preferably, the condenser is located at a continental shelf or in a vertical shaft.

According to a preferred embodiment of the present invention, the above OTEC system further includes an outflow working fluid pipe and an inflow working fluid pipe. The outflow working fluid pipe is to transport the working fluid from the condenser to the evaporator; the inflow working fluid pipe is to transport the working fluid from the turbine to the condenser.

According to a preferred embodiment of the present invention, the above OTEC system further includes a surface sea water delivery pipe connected to the evaporator and having a second inlet end and a second outlet end. The surface sea water delivery pipe is connected to the evaporator via the second outlet end, and the second inlet end is located in the above sea area. According to a preferred embodiment of the present invention, the above first inlet end is located between 700 meters and 1000 meters below the sea level. In view of the above, since the condenser in the present invention is located in a sea area and below the sea level, and the first inlet end is located below the first outlet end, the condenser in the present invention can directly suction deep sea water to the condenser main body so as to perform a heat exchange. Therefore, compared with the conventional art, the deep sea water suction pipe in the present invention has the advantage of a smaller pipe diameter under the same demand for power generation capacity.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
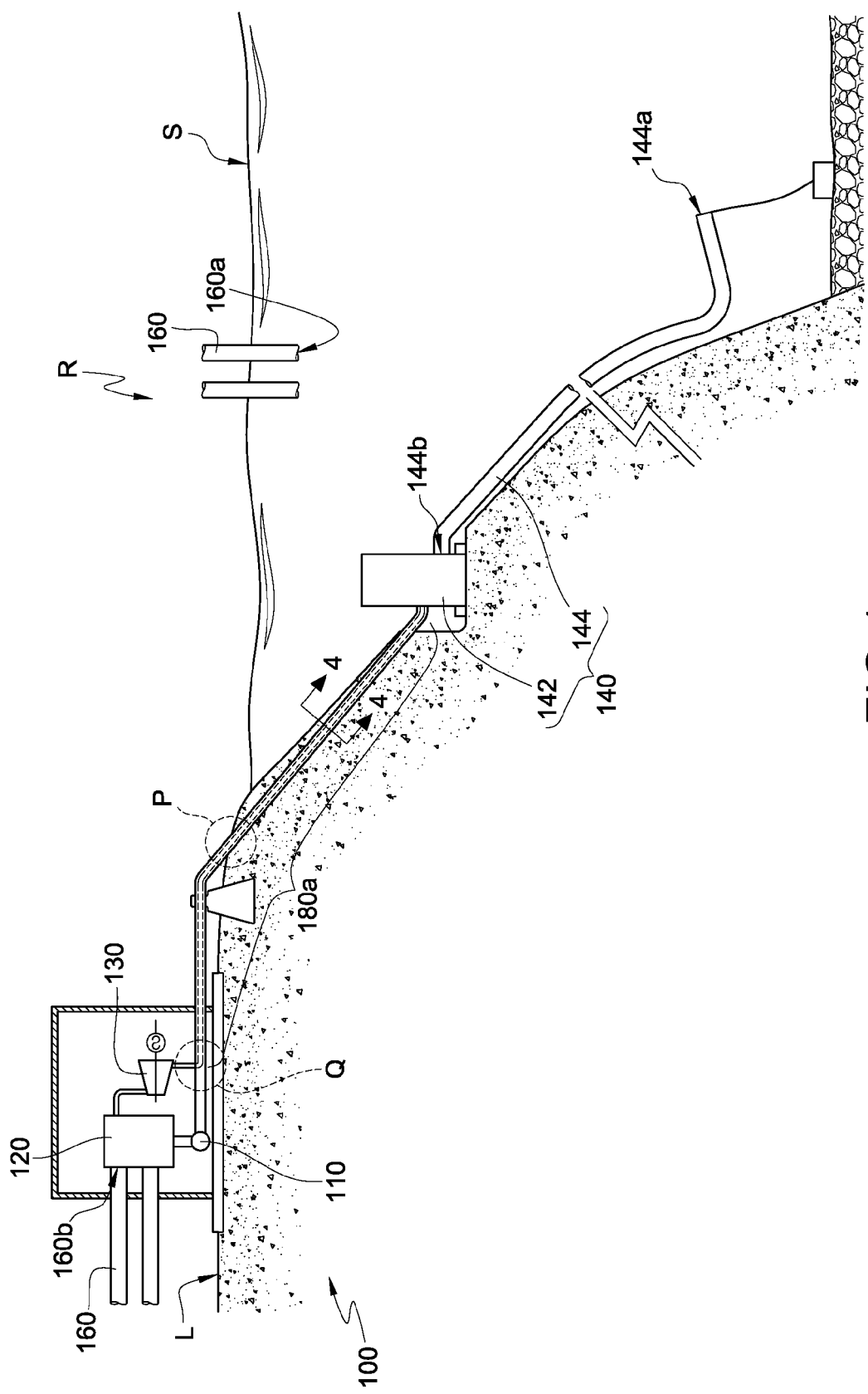
FIG. 1 is a schematic view of an ocean thermal energy conversion (OTEC) system applied in an OTEC according to an embodiment of the present invention.
Figure 2:
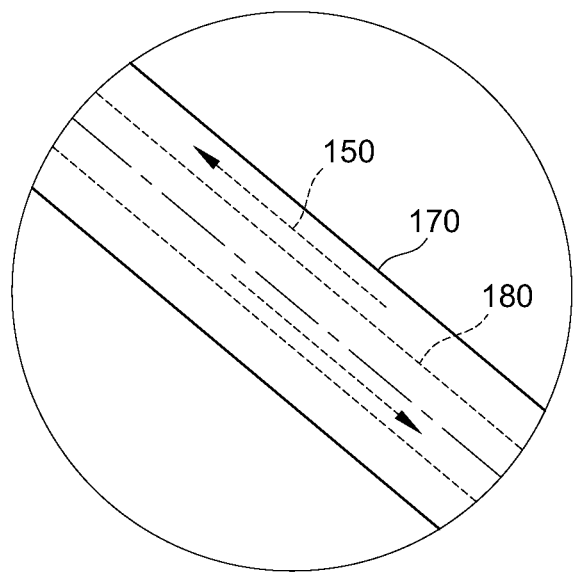
FIG. 2 is a schematic enlarged view of a region P in FIG. 1.
Figure 3:
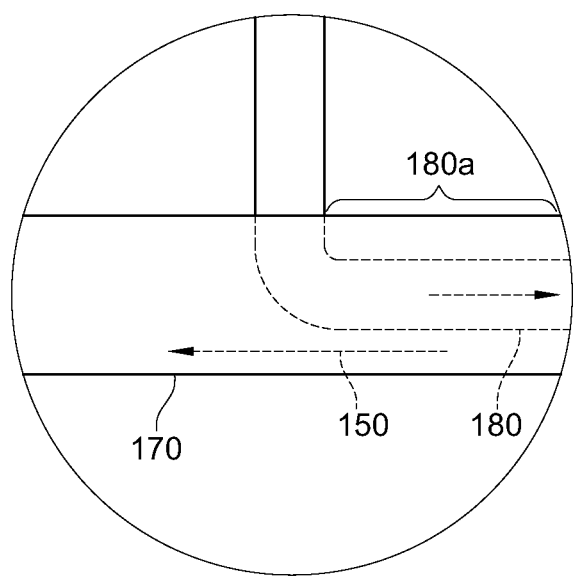
FIG. 3 is a schematic enlarged view of a region Q in FIG. 1.

FIG. 1 is a schematic view of an ocean thermal energy conversion (OTEC) system applied in an OTEC according to an embodiment of the present invention. FIG. 2 is a schematic enlarged view of a region P in FIG. 1. FIG. 3 is a schematic enlarged view of a region Q in FIG. 1. Referring to FIGS. 1 to 3 together, the OTEC system 100 includes a working fluid pump 110, an evaporator 120, a turbine 130, a condenser 140, and some kind of working fluid 150. The working fluid 150 is, for example, ammonia (R717), carbon dioxide (R744), refrigerant (such as R134a), or other kind of working fluid with a low boiling point. For convenient illustration, this embodiment takes ammonia (R717) as an example of the working fluid 150 for illustration.

The evaporator 120 owns working fluid side and water side. At the working fluid side, its inlet is connected to the outlet of the working fluid pump 110; and its outlet is connected to the inlet of the turbine 130. At the water side, surface sea water of a sea area R adjacent to a sea level S is pumped to the inlet of the evaporator 120 via a surface sea water pipe 160. The surface sea water pipe 160 has an inlet end 160a and an outlet end 160b. The surface sea water pipe 160 is connected to the evaporator 120 via the outlet end 160b. The inlet end 160a is located in the sea area R. As can be known from above, this embodiment utilizes the temperature of the surface sea water as a heat source of the evaporator 120.

The inlet of the turbine 130 is connected to the outlet of the evaporator 120. In the turbine 130, the turbine 130 converts the thermal energy and pressure energy of the working fluid 150 into an electric power, and outputs the electric power. It should be noted that, in this embodiment, the working fluid pump 110, the evaporator 120, and the turbine 130 are disposed on land L. The condenser 140 are located in a sea area R and below the sea level S. However, this embodiment does not intend to limit the places where the above elements are disposed. In other embodiments of the present invention, the evaporator 120 and the turbine 130 may also be disposed on a sea surface platform of the sea area R upon demands for actual plant building.

The condenser 140 owns working fluid side and water side. At the working fluid side, its inlet is connected to the turbine 130, so as to transport the vapor working fluid 150 discharged from the turbine 130 to the condenser 140. On the other hand, the outlet of the condenser 140 is connected to the inlet of the working fluid pump 110. In this embodiment, the condenser 140 is located in a sea area R and below the sea level S. At the water side, the inlet is connected to the deep sea water pipe 144. The deep sea water pipe 144 has an inlet end 144a and an outlet end 144b. The deep sea water pipe 144 is connected to the condenser main body 142 via the outlet end 144b, and the inlet end 144a is located below the outlet end 144b. With this invention, the working fluid 150 may have a lower temperature in the condenser main body 142 because of the condenser 140 located at the depth of 50-100 meters below sea surface, which avoids from the sharp temperature rising zone near sea surface, so as to produce a better thermal efficiency of a power system.

Based on the above structure, the working fluid 150 flows through the working fluid pump 110, the evaporator 120, the turbine 130, and the condenser 140 under the driven of the working fluid pump 110, and generates electric energy. The power generation process of this embodiment will be described below. Under the driven of the working fluid pump 110, the high pressure and low temperature liquid working fluid 150 enters the evaporator 120. Afterwards, in the evaporator 120, the liquid working fluid 150 absorbs the surface sea water thermal energy and becomes the saturated vapor working fluid 150 at a high temperature. Then, the saturated vapor working fluid 150 is guided into the turbine 130, transforms the thermal energy into rotational kinetic energy, then electrical energy. After the extraction of the thermal energy in the turbine 130, the working fluid 150 at conditions of low temperature and pressure is transported to the condenser 140. In the condenser 140, the thermal energy of the working fluid is released to deep sea water, such that the working fluid 150 becomes the liquid working fluid 150 at the low temperature and pressure again, then enters the evaporator 120 driven by the working fluid pump 110, which completes the thermodynamic cycle.

Preferably, in this embodiment, since the working fluid 150 is ammonia (R717) and its pressure in the condenser main body 142 is between 5 bars to 10 bars, the condenser main body 142 in this embodiment may be disposed in the ocean 50 meters to 100 meters depth below the sea level S. For example, the condenser main body 142 in this embodiment may be disposed on a continental shelf or in a vertical shaft. In this way, the pressure of the working fluid 150 in the condenser main body 142 is equivalent to the surrounding water pressure, and thus this embodiment may employ a condenser of lower pressure proof with the conventional art.

Figure 4:
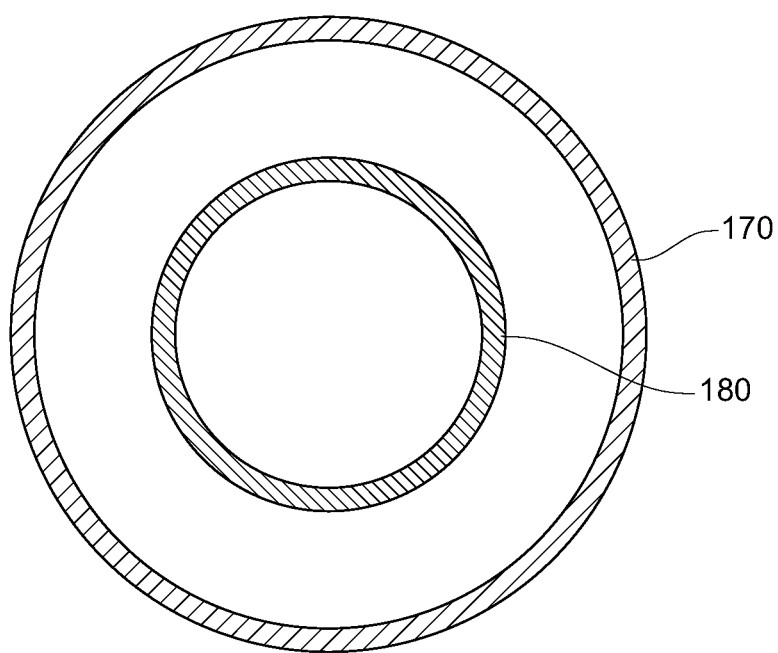
FIG. 4 is a schematic cross-sectional view of an outflow working fluid pipe and an inflow working fluid pipe taken along a cross-sectional line 4-4 in FIG. 1.

FIG. 4 is a schematic cross-sectional view of an outflow working fluid pipe and an inflow working fluid pipe taken along a cross-sectional line 4-4 in FIG. 1. In order that the OTEC system 100 has a good power generation efficiency, in addition to the above structure, in this embodiment, the OTEC system 100 may further include an outflow working fluid pipe 170 and an inflow working fluid pipe 180. The outflow working fluid pipe 170 is connected between the working fluid pump 110 and the condenser 140. The inflow working fluid pipe 180 is connected between the turbine 130 and the condenser 140. Since in an OTEC system, the amount of the working fluid is only 1%-2% of that for the sea water, this embodiment uses a small diameter of working fluid pipe instead of the large diameter of a water pipe in the conventional art. Not only the manufacturing and constructing cost of the sea water pipe is reduced greatly, but also the problem of poor reliability resulted from the large diameter of a sea water pipe is resolved.

What is claimed is:

1. An ocean thermal energy conversion (OTEC) system comprising:
    a working fluid pump;
    an evaporator connected to the working fluid pump;
    a turbine connected to the evaporator;
    a condenser, connected to the turbine and the working fluid pump, located below a sea surface, wherein the condenser includes a condenser main body connected to the turbine and the working fluid pump, and a deep sea water pipe, connected to the condenser main body and having a first inlet end and a first outlet end, wherein the deep sea water pipe is connected to the condenser main body via the first outlet end;

a working fluid, flowing between the working fluid pump, the evaporator, the turbine, and the condenser by a driving of the working fluid pump;

an outflow working fluid pipe connecting the evaporator and the condenser; and an inflow working fluid pipe connecting the turbine and the condenser, wherein a portion of the inflow working fluid pipe is located in the outflow working fluid pipe.

2. The OTEC system according to claim 1, wherein the working fluid pump, the evaporator, and the turbine are located on the sea surface or on land.

3. The OTEC system according to claim 1, wherein the condenser main body is located between 50 meters and 100 meters below the sea surface.

4. The OTEC system according to claim 3, wherein the condenser main body is located on a continental shelf or in a vertical shaft.

5. The OTEC system according to claim 1, further comprising a surface sea water pipe connected to the evaporator and having a second inlet end and a second outlet end, wherein the surface sea water pipe is connected to the evaporator via the second outlet end, and the second inlet end is located in an area of the sea.

6. The OTEC system according to claim 1, wherein the first inlet end is located between 700 meters and 1000 meters below the sea surface.

7. The OTEC system according to claim 1, wherein the inflow working fluid pipe is coaxial with the outflow working fluid pipe.

* * * * *